June 20, 1967 T. D. BUSHMAN ET AL 3,326,071

DICING MACHINE

Filed March 19, 1965 2 Sheets-Sheet 1

INVENTORS
THOMAS D. BUSHMAN
GEORGE J. SEYMOUR
BY
ATTORNEY

June 20, 1967 T. D. BUSHMAN ETAL 3,326,071

DICING MACHINE

Filed March 19, 1965 2 Sheets-Sheet 2

INVENTORS
THOMAS D. BUSHMAN
GEORGE J. SEYMOUR
BY
Lewis M. Smith, Jr.
ATTORNEY

United States Patent Office 3,326,071
Patented June 20, 1967

3,326,071
DICING MACHINE

Thomas D. Bushman, Holden, and George J. Seymour, Leicester, Mass., assignors to Norton Company, Worcester, Mass., a corporation of Massachusetts Filed Mar. 19, 1965, Ser. No. 441,084
11 Claims. (Cl. 83—7)

The instant invention relates to a dicing machine for cutting through thin sections of hard crystalline material and more particularly to a dicing machine for cutting thin wafers of semiconductor material into precisely sized and oriented very small dice. The instant invention also relates to a method for the precise location and orientation within a dicing machine of a workpiece consisting of a thin wafer of semiconductor material and more particularly to a method for the proper location and angular orientation within a dicing machine of a thin wafer of semiconductor material bearing a large number of micro-miniature electronic circuits so that the wafer of semiconductor material may be cut into a large number of very small dice each bearing a complete micro-miniature circuit undamaged by the cutting operation.

Thin wafers of semiconductor material have for some time been cut into very small dice in connection with the manufacture of transistors and other electronic components by means of various types of rotating and reciprocating saws used singly or in ganged arrays. However, it has proved extremely difficult to control the location and angular orientation of the wafer relative to one or more blades with sufficient accuracy when the wafer bears on its surface a large number of closely spaced micro-miniature electronic circuits. Alternatively, wafers bearing such circuits have been scribed between adjacent circuits with a single point scribing tool to form a scribed grid and then been broken along the intersecting scribed lines by flexing the wafer to form separate dice. At best, dice manufactured by either of these methods tend to have chipped and otherwise irregular edges which make the dice difficult to handle and which may result in defective micro-miniature circuits due to cracking or other flaws in the dice so produced. Further difficulties are encountered when the dicing operation is performed on a wafer on which there is a thin surface layer of other material such as silicon dioxide because of the tendency to tear off the surface layer in the course of a cutting or scribing operation.

The present invention contemplates a dicing machine rigidly supporting one or more wafers during a dicing operation performed by a large number of extremely thin straight elongated blades precisely spaced and rigidly supported so that smooth cutting edges of the multiple blades reciprocating in engagement with the surface of a wafer in the presence of an extremely fine abrasive will cut a large number of precisely spaced and located parallel slits through a wafer, first in one direction and then in another direction at right angles to the first direction, to form a large number of dice with smooth square edges so that each dice bears an intact micro-miniature circuit disposed centrally of one face with a kerf loss as small as 3 thousandths of an inch.

The present invention also contemplates a method of locating and angularly orienting wafers bearing micro-miniature circuits on the workpiece support of a dicing machine so that each wafer is properly located and oriented for making the first series of parallel cuts therethrough and thereafter properly located and angularly oriented by the same method for making the second series of parallel cuts therethrough, both minimizing the risk of damaging the micro-miniature circuits during the cutting operation and providing dice with square smooth lapped side surfaces.

For example, the dicing machine comprising the instant invention may be provided with multiple saw blades of minimum thickness in the range of 1 to 2 thousandths of an inch thick mounted between alternate spacers less than 30 thousandths of an inch thick to cut wafers less than 10 thousandths of an inch thick, each with a complete micro-miniature circuit on one face. From consideration of the dimensions involved, it will be evident that alignment of the wafer to be cut relative to the multiple saw blades is critical and that the cumulative error in the spacing of the blades across the full width of a wafer must be held within extremely critical limits in the order of 1 thousandth across as many as seventy dice in a span up to 1½ inches.

Accordingly, it is an object of the instant invention to provide a dicing machine arranged to support multiple saw blades and workpieces consisting of thin wafers of hard crystalline material for relative movement with a very high degree of precision during the cutting operations necessary to produce a large number of very small dice from the thin wafers of crystalline material.

Another object is the provision on a dicing machine of wafer supporting means and cooperating means for determining the proper position and orientation of each wafer to be cut relative to the multiple blades.

Still another object of this invention is the provision of a method for manipulating the means for determining the proper position and angular orientation of each wafer to be cut.

Yet another object is the provision of means for fully supporting a multiplicity of extremely thin elongated blades over most of their length and most of their width in precise alignment with a supporting means on which the multiple blades are reciprocated.

A further object is the provision of multiple blade supporting means for a dicing machine removable from a dicing machine for reconditioning or replacing multiple blades mounted therein and also including precision adjustment means operable when said multiple blade supporting means is installed on a dicing machine to precisely align the multiple blades with the suporting means on which the multiple blades are reciprocated.

A final object of this invention is the provision of means for feeding a thin wafer of crystalline material toward the reciprocating multiple blades in a dicing machine including means to support and maintain each thin wafer of crystalline material precisely in a predetermined position and angular orientation relative to the reciprocating multiple blades.

Other objects and advantages of the instant invention will be apparent from consideration of the following description and the accompanying drawings wherein.

Figures 1, 2, 7, 8:
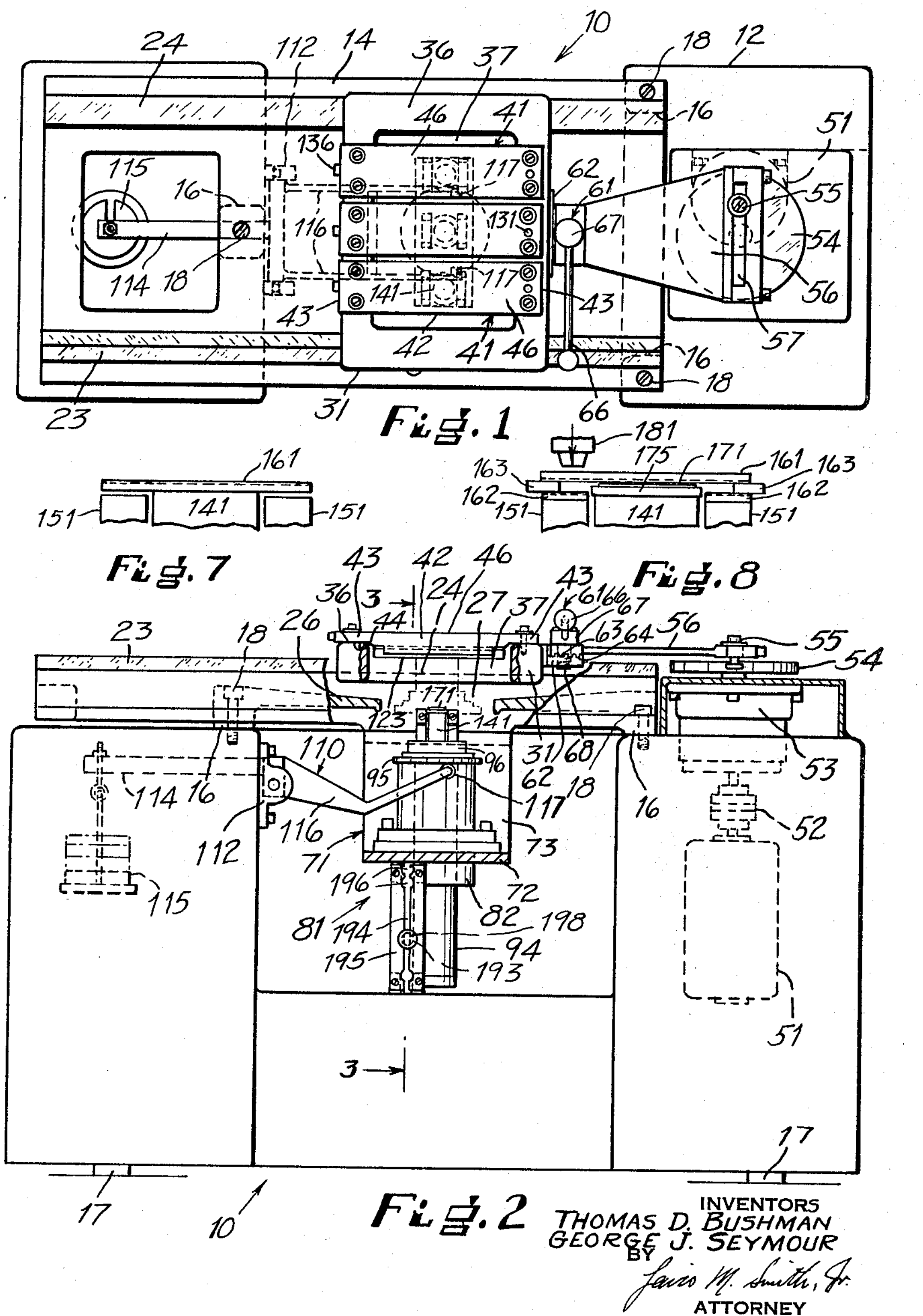
FIG. 1 is a plan view of the preferred embodiment of the dicing machine.
FIG. 2 is a side elevation, partially broken away, of the preferred embodiment of the dicing machine.
Figure 3:
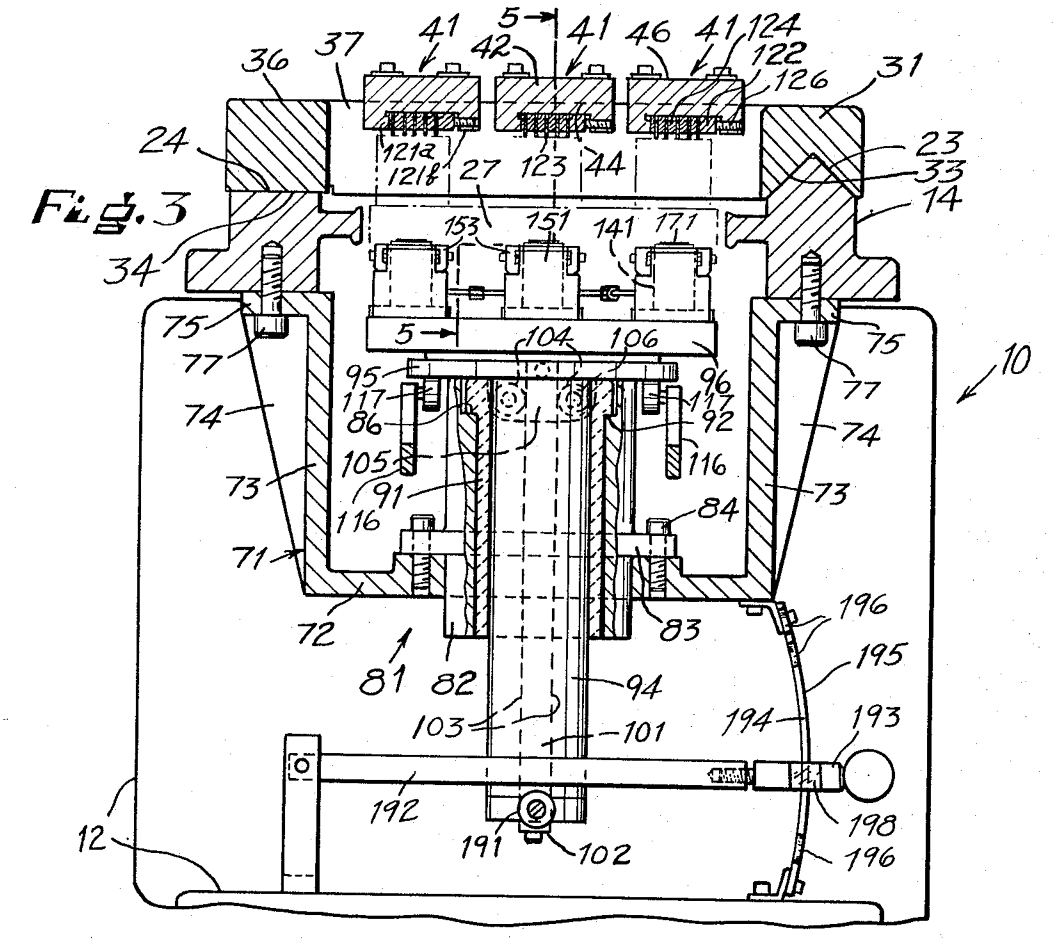
FIG. 3 is a vertical section taken on line 3—3 of FIG. 1.
Figures 4, 5, 6:
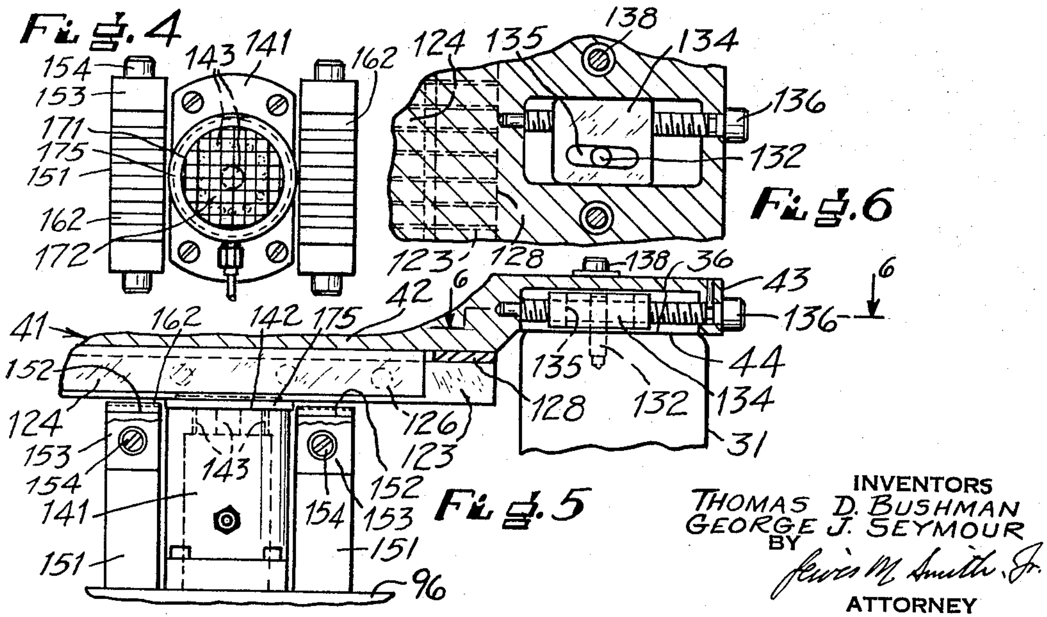

FIG. 4 is a detailed plan view showing a representative workholder and the adjoining supports for the workpiece locating and aligning means, FIG. 5 is a detailed vertical section taken on line 5—5 of FIG. 3 showing a workpiece positioned for a cutting operation and showing details of the precision alignment means for the elongated multiple blade supporting member, FIG. 6 is a partial section taken on line 6—6 of FIG. 5 also showing details of the precision alignment means for a multiple blade supporting member, and FIG. 7 is a partial side view of a typical workpiece support illustrating the first step in the preparation of means for locating and angularly orienting a workpiece, and FIG. 8 is a partial side view of a typical workpiece support showing the workpiece positioning and angular orienting means in operative relation to the workpiece support.

Referring now to the drawings wherein like reference numerals refer to like or corresponding parts, the dicing machine generally designated by the reference number 10, shown best in FIGS 1 and 2, comprises a supporting structure 12 upon which is mounted a massive one-piece rigid main supporting frame 14 with three spaced mounting pads 16 resting on the upper surface of the supporting structure 12. Since the supporting structure 12 is provided with three spaced feet 17, the dicing machine 10 may be set up as shown in FIG. 2 on any suitable relatively flat surface and the rigid main supporting frame 14 may be secured to the supporting structure 12 by suitable attachment means such as screw bolts 18 through the mounting pads 16 without creating any internal stresses which would tend to distort the rigid main supporting frame 14. The rigid main supporting frame 14 includes a V-way 23 and a parallel flat-way 24 both formed integrally with the unitary main supporting frame 14 to provide suitable support for a massive one-piece rigid rectangular blade package supporting frame 31 provided with V-slide 33 and flat-slide 34 respectively slidably engaging the V-way 23 and the flat-way 24. The blade package supporting frame 31 is provided with a planar upper surface extending peripherally of a rectangular central opening 37 through the blade package supporting frame 31.

The rectangular blade package supporting frame 31 in turn supports a series of elongated multiple blade supporting members generally designated by the reference numeral 41, each including an elongated flat rigid backing plate 42 and a pair of extensions 43 formed integrally therewith and extending from the opposite ends thereof having coplanar lower surfaces 44 for engagement with the planar upper surface 36 of the blade package supporting frame 31 and sharing with the rigid backing plate 42 a planar upper surface 46 parallel to the surfaces 44.

The blade package supporting frame 31 is reciprocated upon the main supporting frame 14 by a drive means which may conveniently consist of a variable speed electric motor 51, a coupling 52, a speed reducer 53, a disc 54 fitted with an eccentric 55, and a plate 56 provided with a transverse slot 57 engaged by the eccentric 55, so that the plate 56 and the blade package supporting frame 31 attached thereto are reciprocated relative to the main supporting frame 14 as the disc 54 is rotated.

In order to facilitate the setup and operation of the dicing machine 10, the drive means may include a quick disconnect mechanism generally designated by the reference numeral 61, best illustrated in FIGS. 1 and 2, including a block 62 fixedly secured to the blade package supporting frame 31 and provided with precisely formed transversely extending offset surfaces 63 engaged by complementary precisely formed transversely extending offset surfaces 64 adjacent the end of plate 56. The quick disconnect mechanism 61 also includes a quick release clamping means which may as illustrated in FIGS. 1 and 2 include a handle 66 for rotating a boss 67 and a threaded screw 68 dependent therefrom clockwise as seen in FIG. 1 to secure the plate 56 to the block 52 and counter-clockwise as seen in FIG. 1, to release the plate 56 which is slotted adjacent the offset surfaces 64 so that it may be moved readily into and out of the space between the offset surfaces 63 and the boss 67 without interference with the screw 68 whenever the handle 66 has been rotated counterclockwise sufficiently to permit such movement.

The main supporting frame 14 also supports a workpiece feed mechanism generally designated by the reference numeral 81 by means of a rigid generally U-shaped bracket generally designated by the reference numeral 71 including a flat bottom portion 72, a pair of vertical side portions 73, reinforcing ribs 74, and mounting flanges 75. The bracket 71 may be fixedly secured to the main supporting frame 14 by any suitable attachment means such as the bolts 77 through flanges 75, illustrated in FIG. 3.

The feed mechanism 81 as shown in FIGS. 2 and 3 includes an annular sleeve 82 provided with an external flange 83 resting upon and secured to the bottom portion 72 of bracket 71 by means of machine screws 84. The annular sleeve 82 is also provided with an inner shoulder 86 supporting an elongated annular bushing 91 made from nylon or the like and provided with an external shoulder 92 engaging the shoulder 86 so that the bushing 91 is rigidly supported concentrically within the annular sleeve 82 to provide a precision guiding surface for a substantially elongated cylindrical plunger 94 provided adjacent its upper end with a large horizontal flange 95 overhanging the annular sleeve 82 and supporting at the upper end of plunger 94 a transversely elongated workpiece supporting plate 96.

Referring again to FIG. 3, the cylindrical plunger 94 is precisely constrained against rotation within the bushing 91 by means of a bar 101 fixedly secured at its upper end to the flange 95 and provided at its lower end with a leg 102 secured to the bottom of the plunger 94. The parallel sides 103 of the bar 101 precisely aligned with the central axis of the plunger 94 are constrained between a pair of rollers 104 rotatably mounted upon a face 105 on the periphery of sleeve 82. In order to provide for adjustment of the spacing between the rollers 104 to eliminate play, one of the rollers 104 may be mounted on an eccentric adjustable mounting means 106.

In order to provide vertical feeding movement of the plunger 94, an elongated member generally designated by the reference numeral 110 is pivotally supported midway of its length on a pair of pillow blocks 112 fixedly secured to the supporting structure 12 as shown in FIGS. 1 and 2 so that the beam portion 114 of the elongated member 110 supports selected dependent weights 115 and so that yoke portion 116 at the other end of elongated member 110 biases rollers 117 pivotally supported thereby into bearing engagement with the under surface of flange 95, the yoke portion 116 being so arranged that the common pivotal axis of the rollers 117 substantially intersects the central axis of the plunger 94 when the workpieces are positioned in engagement with the multiple blades 123.

Referring now to the details of the elongated multiple blade supporting members generally designated by the reference numeral 41, it will be evident from the showing in FIGS. 2 and 3 that the rigid backing plate 42 also includes integral dependent parallel side rails 121*a* and 121*b* forming the opposing fixed jaws of a clamp assembly including an elongated clamping bar 122 forced into engagement with a series of blades 123 and alternate series of spacers 124 by a spaced series of clamping screws 126 threadably engaged with suitable threaded holes through side rail 121*b*.

Since the elongated multiple blade supporting members 41 are removed from the dicing machine 10 to replace or recondition the blades 123, the elongated multiple blade supporting members 41 may be inverted on a workbench to facilitate the removal and replacement of blades 123 and spacers 124. The blades 123 extending beyond both ends of the elongated spacers 124 as shown in FIG. 5 may be supported on a pair of shim blocks 128 of the proper thickness to support the blades 123 with their cutting edges projecting beyond the adjacent edges of the spacers 124 by an amount sufficient to permit the cutting edges of the blades to pass through a thin workpiece without interference from the adjacent edges of the spacers 124.

After a series of blades 123 and an alternate series of spacers 124 are fixedly secured in an elongated multiple blade supporting member 41 by tightening clamping screws 126, the elongated multiple blade supporting member 41 may be placed on the table of a surface grinder so that it is supported by its planar upper surface 46 for passage lengthwise beneath the grinding wheel of the surface grinder so that the cutting edges of all of the blades 123 are ground to lie in a common cutting plane which may, for example, be spaced about 20 thousandths from a parallel plane intersecting the adjacent edges of the spacers 124. Additionally, the assembled blades 123 may be reconditioned several times without removal from the elongated multiple blade supporting member by removing and inverting the multiple blade supporting member 41, by loosening the clamping screws 126, by replacing the shim blocks 128 with a pair of slightly thicker shim blocks 128, by retightening the clamping screws 126 and then by regrinding the cutting edges of the blades in the manner described above so that the worn portions of the blades 123 are removed and the cutting edges of the blades 123 once more lie in a common cutting plane.

When the multiple blade supporting member 41 is mounted upon the rectangular blade package supporting frame 31, a hole in one of the extensions 43 is tightly engaged by a pin 131 projecting from the planar upper surface 36, and a pin 132 projecting from the planar upper surface 36 at the other end of rectangular blade package supporting frame 31 is engaged by a cam block 134 mounted within multiple blade supporting member 41 and provided with a cam slot 135 slightly angularly offset. Thereafter, the cam block 134 may be displaced lengthwise of the multiple blade supporting member 41 by rotation of the adjustment screw 136 rotatably mounted in the multiple blade supporting member 41, until the blades 123 are precisely aligned with the path of movement of the rectangular blade package supporting frame 31. Each multiple blade supporting member 41 is fixedly secured in its precisely aligned position relative to the blade package supporting frame 31 by means of four locking screws 138.

The workpiece supporting plate 96 has attached to its upper surface a series of workpiece supporting and securing means each consisting of a vacuum chuck assembly 141 with a planar upper surface provided with a series of vacuum ports 143 therethrough.

The means for locating and angularly orienting each workpiece described further below in connection with the showing in FIG. 4 and FIGS. 7 and 8 are supported adjacent to each vacuum chuck assembly 141 by a pair of pedestals 151 fixedly secured to the workpiece supporting plate 96 so that they are spaced lengthwise of and extend transversely of the path of movement of the blade package supporting frame 31. The respective pedestals 151 are provided with flat coplanar upper surfaces 152 disposed parallel to and slightly below the upper surface 142 of the vacuum chuck assembly 141 and each pedestal 151 is provided with an opposed pair of adjustable clamp members 153, each secured to the pedestal 151 by a clamping screw 154.

The means for locating and angularly orienting each workpiece includes a relatively elongated thin flat reference member 161 of hard transparent material mounted upon vacuum chuck assembly 141 and overlying the pair of pedestals 151 as shown in FIG. 7 to be scribed on one face by reciprocation of the blades 123 and a pair of relatively short thin flat reference blocks 162 of hard material secured on the planar upper surfaces 152 of the respective pedestals 151 by clamp members 153 as shown in FIG. 4, and scribed by the reciprocation of the blades 123.

In order to set up workpieces 171 comprising thin wafers of hard crystalline material bearing a large number of closely and regularly spaced micro-miniature circuits on one face thereof, so that each workpiece 171 is properly located and angularly oriented to be cut into a large number of dice 172, each workpiece 171 is temporarily bonded to a flat support comprising a circular workpiece support 175 which may conveniently be made of flat thin glass or like material.

Before the workpieces 171 are mounted on the respective vacuum chuck assemblies 141 an elongated reference member 161 is mounted upon each vacuum chuck assembly 141 as shown in FIG. 7 and secured in this position either by clamp members 153 or by operation of the vacuum chuck assembly 141, while the blades 123 supported in the blade package supporting frame 31 are reciprocated in the presence of a very fine abrasive slurry to scribe the elongated reference member 161 with a series of spaced parallel lines coincident with the paths of the respective blades 123. After the elongated reference member 161 is removed, a pair of reference blocks 162 is clamped on the planar upper surfaces 152 of the respective pedestals 151 as shown in FIG. 4 by tightening the clamp members 153 with clamping screws 154. The reference blocks 162 are then scribed by reciprocation of the blades 123 supported by the blade package supporting frame 31 in the presence of a very fine abrasive slurry to scribe on reference blocks 162 spaced parallel lines locating the paths of the respective blades 123.

Next, the workpiece 171 bonded to a circular workpiece support 175 is positioned on the upper surface 142 of the vacuum chuck assembly 141 as shown in FIG. 8 and spacer blocks 163 are bonded to the scribed surface of elongated reference member 161 adjacent the opposite ends thereof so that the elongated reference member 161 may be inverted end over end for placement as shown in FIG. 8 with clearance sufficient to permit lateral movement of the workpiece 171 without interference with the scribed surface of elongated reference member 161.

Using a viewing means 181 which may consist of a microscope of the type commercially available, with a viewing axis normal to the cutting plane, the lines scribed on the elongated reference member 161 are first aligned vertically with the corresponding lines scribed on the pair of reference blocks 162 in planes perpendicular to the cutting plane. The workpiece 171 is then located and angularly oriented by sighting through the viewing means 181 so that the micro-miniature circuits on its upper face are disposed symmetrically between the respective lines scribed on the elongated reference member 161 on the paths of the respective blades 123. This operation may be facilitated by drawing a relatively low vacuum on the vacuum chuck assembly 141. The workpiece 171 is then secured for the cutting operation by drawing a relatively high vacuum on the vacuum chuck assembly 141.

After this procedure is repeated to properly position and angularly orient each workpiece 171, each elongated reference member 161 is removed and the blade package supporting frame 31 is coupled to the drive mechanism by the quick disconnect mechanism 161 so that the blades 123 may be reciprocated in the presence of a very fine slurry applied to the upper surface of each workpiece 171, while the plunger 94 is biased toward the blade package supporting frame 31 by the weights 115.

After the first workpiece cutting operation is completed, the procedure for locating and angularly orienting each workpiece is repeated using the same elongated reference member 161 to properly position each workpiece at right angles to its previous position and the cutting operation described above is repeated to complete the division of each workpiece 171 into a large number of dice 172.

Noting that the procedure for positioning the workpieces and the subsequent cutting operation require that the blade package supporting frame be alternately coupled to and reciprocated by the driving means and otherwise be displaced to one side for access to the area above the workpiece supporting plate, the frequent transition between these two conditions is facilitated by the provision of the quick disconnect mechanism 61 described above and illustrated in the drawings. Similarly, the necessary manipulation of the feed mechanism 81 into various positions convenient for different operations such as loading, positioning, and unloading the workpieces is facilitated by the provision of a roller 191 pivotally supported on one side of the lower end of plunger 94 for engagement with an elongated lever pivoted at one end to the supporting structure 12 and provided at the other end with a rotatable handle portion 193 with a flatted section extending through a slot 194 in a segment 195 secured to the supporting structure 12 and to the bracket 71 so that the plunger 94 may be moved to and maintained in a desired position by displacement of the handle portion 193 along the slot 194 and rotation of the handle portion 193 into engagement with an enlarged circular portion 196 of the slot 194. Since the lever 192 engaging the roller 191 overrides the weights 115, the plunger 94 may be positioned as required for various purposes without first removing the weights 115. On the other hand, the lever 192 is readily moved to and secured in an uppermost position clear of the roller 191 to permit feeding movement of the plunger 94 controlled by the weights 115.

The details of the viewing means 181 and its supporting means are neither illustrated nor described herein, since they form no part of the instant invention. However, this viewing means may comprise any suitable commercially available equipment, such as an industrial microscope supported on a horizontal boom, in turn adjustably supported upon a suitable bracket attached to the supporting structure 12 so that the viewing means 181 may be positioned as needed in alignment with each of the vacuum chuck assemblies 141 with its viewing axis maintained normal to the planar upper surface 142 of each vacuum chuck assembly 141.

No means of supplying a fine abrasive slurry is shown because it may be applied manually as with a brush to each workpiece or other surface about to be cut. Alternatively, the abrasive slurry may be supplied automatically either continuously or intermittently during a cutting operation by a suitable slurry delivery system arranged to direct slurry across the surface being cut.

Thus, the present invention provides a dicing machine arranged to employ extremely thin straight blades to make dice from thin wafers of hard crystalline material with a very small kerf loss. The dicing machine of the instant invention is also arranged to accommodate an extremely precise procedure for positioning and angularly orienting workpieces comprising thin wafers of hard crystalline material bearing a large number of closely spaced micro-miniature circuits. Moreover, the dicing machine of the instant invention assures very precise relative displacement of multiple blades and workpieces to be cut thereby by providing a massive one-piece main supporting frame directly supporting both the reciprocating blade package supporting frame and the workpiece feed mechanism. Finally, the dicing machine described and illustrated herein combining all of the features enumerated immediately above is capable of producing large numbers of dice each bearing an intact micro-miniature circuit and each having square smoothly finished sides to facilitate handling the dice either manually or with automatic handling equipment.

The embodiment of the instant invention described herein and illustrated in the accompanying drawings is to be considered as illustrative of the instant invention rather than in a limiting sense, since various modifications of this apparatus are contemplated within the scope of the appended claims.

What is claimed is:

1. The method of locating and angularly orienting a flat workpiece to be cut into precisely located and oriented segments, comprising mounting a flat relatively elongated member of hard transparent material across the space between and in fixed relation to a pair of upstanding supports spaced lengthwise of the elongated member, scribing spaced lines lengthwise of the flat elongated member with spaced parallel cutting edges reciprocable in a common plane, removing the elongated member, fixedly mounting relatively short flat blocks of hard material upon the respective spaced upstanding supports, scribing spaced lines on said blocks with the same spaced parallel cutting edges, mounting a workpiece to be cut into precisely oriented segments upon a workpiece support upstanding between said upstanding supports, inverting the elongated member end over end and aligning the lines scribed on the elongated member with the corresponding lines scribed on the short blocks, thereafter positioning and orienting the workpiece immediately beneath and in alignment with the lines scribed on the elongated member, securing the workpiece in the properly located and angularly oriented position, and thereafter removing the elongated member so that the workpiece may be cut into properly oriented segments by reciprocation of the same spaced parallel cutting edges.

2. The method of locating and angularly orienting a flat thin workpiece to be cut into precisely located and oriented small segments upon a dicing machine equipped with a multiplicity of spaced parallel elongated blades with their respective elongated cutting edges reciprocable in a common plane, comprising mounting a flat relatively elongated member of hard transparent material across the space between and in fixed relation to a pair of upstanding supports on the dicing machine spaced lengthwise of the elongated blades, scribing spaced lines lengthwise of the thin flat elongated member by reciprocation of the elongated multiple blades, removing the elongated member, fixedly mounting relatively short flat blocks of hard material upon the respective spaced upstanding support, scribing spaced lines on said blocks by reciprocation of the elongated multiple blades, mounting a workpiece to be cut into precisely oriented segments upon a workpiece support upstanding between said upstanding supports, inverting the same elongated member end over end and aligning the lines scribed on the elongated member with the corresponding lines scribed on the blocks, thereafter positioning and orienting the workpiece immediately beneath and in alignment with the lines scribed on the elongated member, securing the workpiece in the properly located and angularly oriented position, and thereafter removing the elongated member so that the workpiece may be cut into properly oriented segments by reciprocation of the multiple blades.

3. The method of locating and angularly orienting a flat thin workpiece to be cut into precisely located and oriented small segments upon a dicing machine equipped with a multiplicity of spaced parallel elongated blades with their respective elongated cutting edges reciprocable in a common plane, comprising mounting a thin flat relatively elongated member of hard transparent material across the space between and in fixed relation to a pair of upstanding supports on the dicing machine spaced lengthwise of the elongated blades, scribing spaced lines lengthwise of the thin flat elongated member by reciprocation of the elongated multiple blades, removing the elongated member, fixedly mounting relatively short flat reference blocks of hard material upon the respective spaced upstanding supports, scribing spaced lines on said blocks by reciprocation of the same elongated multiple blades, mounting a workpiece comprising a wafer to be cut into precisely oriented segments upon a workpiece support upstanding between said upstanding supports, adding spacers to the scribed surface of the same elongated member, inverting the same elongated member end over end to place the spacers in engagement with the reference blocks, aligning the lines scribed on the elongated member with the corresponding lines scribed on the reference blocks so that corresponding lines lie in planes normal to the common plane, thereafter positioning and orienting the workpiece immediately beneath and in alignment with the lines scribed on the elongated member, securing the workpiece in the properly located and angularly oriented position, and thereafter removing the elongated member so that the workpiece may be cut into properly oriented segments by reciprocation of the same multiple blades.

4. Apparatus for cutting thin hard material comprising a main supporting frame including integral slideways thereon so disposed that they establish a reference plane of cutting action, rigid supporting means secured to and dependent from said main supporting frame, a workpiece feed mechanism mounted upon said rigid supporting means and biased toward said main supporting frame for rectilinear movement precisely along a line of feeding action normal to the reference plane of cutting action, a blade package supporting frame mounted for reciprocal movement along said parallel slideways and constrained to move precisely in a straight line in a given direction parallel to the reference plane of cutting action, a least one blade package including a plurality of elongated flat blades with longitudinal cutting edges and a rigid elongated multiple blade supporting member bridging and fixedly secured to said blade package supporting frame in precise alignment with the given direction of reciprocation, said multiple blade supporting member including means to secure and fully constrain each of said plurality of elongated flat blades over its entire length between opposite end portions thereof and across substantially its entire width except for a very narrow projecting portion adjacent its longitudinal cutting edge and drive means coupled to said blade package supporting frame operable to produce reciprocating movement of said blade package supporting frame relative to said main supporting frame.

5. A device as described in claim 4, wherein each said multiple blade supporting member includes a flat rigid backing plate with both ends thereof arranged for engagement with said blade package supporting frame, said backing plate having fixed elongated clamping portions dependent from opposite sides thereof, and wherein the means to secure and fully constrain the plurality of elongated flat blades includes a plurality of elongated flat spacers alternately interfitted between adjacent blades so that the longitudinal cutting edges of the respective blades projecting slightly below the lower edges of the respective elongated spacers lie in a common plane coincident with the plane of cutting action, and movable elongated clamping means positioned and biased to maintain said plurality of elongated blades and said plurality of elongated spacers in mutual bearing engagement between said fixed elongated clamping portions.

6. Apparatus for cutting thin sections of hard material in the presence of an abrasive slurry comprising a main supporting frame including integral spaced parallel slideways thereon so shaped and disposed that they establish a reference plane of cutting action, rigid supporting means secured to and dependent from said main supporting frame, a workpiece feed mechanism mounted upon and guided by said rigid supporting means and biased toward said main supporting frame for rectilinear movement precisely along a line of feeding action normal to the reference plane of cutting action, an open rectangular rigid blade package supporting frame mounted for reciprocal movement along said parallel slideways and constrained by said slideways to move in a straight line in a given direction parallel to the reference plane of cutting action, at least one blade package including a plurality of flat very thin blades with straight longitudinal cutting edges and a rigid elongated multiple blade supporting member bridging and fixedly secured to said blade package supporting frame in precise alignment with the given direction of reciprocation, said multiple blade supporting member including means to secure and fully constrain each of said plurality of elongated flat very thin blades each over substantially its entire length between opposite short end portions thereof and across substantially its entire width except for a very narrow projecting portion adjacent its longitudinal cutting edge, and drive means coupled to said blade package supporting frame operable to produce reciprocating movement of said blade package supporting frame relative to said main supporting frame.

7. A device as described in claim 6, wherein said multiple blade supporting member includes a flat rigid backing plate with extensions thereof projecting from both ends thereof coplanar therewith for engagement with said blade package supporting frame, said backing plate having fixed rigid elongated clamping portions dependent from opposite sides thereof and wherein the means to secure and fully constrain the plurality of elongated flat very thin blades includes a plurality of elongated flat spacers alternately interfitted between adjacent blades so that the longitudinal cutting edges of the respective blades projecting slightly below the lower edges of the respective elongated spacers lie in a common plane comprising the plane of cutting action, and movable elongated clamping means disposed lengthwise of said backing plate and biased transversely of said backing plate along its entire length to maintain said plurality of elongated blades and said plurality of elongated spacers in mutual bearing engagement between said fixed elongated clamping portions.

8. Apparatus for cutting thin wafers of hard crystalline material comprising a flat rigid main supporting frame including spaced parallel slideways thereon, a supporting structure secured to and arranged to maintain said main supporting frame so disposed that a reference plane of cutting action established by said slideways is substantially horizontal, rigid supporting means secured to and dependent from said main supporting frame, a workpiece feeding means mounted upon said rigid supporting means for rectilinear movement precisely along a line of feeding action normal to the reference plane of cutting action, means operable to bias said feeding means upwardly toward said main supporting frame, an open rectangular rigid blade package supporting frame mounted upon and constrained by said parallel slideways and to move precisely in a straight line along said slideways in a given direction parallel to the reference plane of cutting action, a plurality of blade packages each including a plurality of elongated flat very thin blades with longitudinal cutting edges and a rigid elongated multiple blade supporting member bridging and fixedly secured to said blade package supporting frame in precise alignment with the given direction of reciprocation, said multiple blade supporting member including means to secure and fully constrain each of said plurality of elongated flat very thin blades by uninterrupted bearing engagement with its opposite sides over a substantial central portion encompassing most of its length and across substantially its entire width except for a very narrow projecting portion adjacent its longitudinal cutting edge, and drive means mounted upon said supporting structure and coupled to said blade package supporting frame operable to produce reciprocating movement of said blade package supporting frame relative to said main supporting frame.

9. Apparatus as described in claim 8 wherein said means for supporting and guiding a feeding means consists of an elongated sleeve provided with an elongated precision bearing means and said workpiece feeding means includes an elongated workpiece feeding member slidably supported and precisely positioned by said sleeve member provided at its upper end with workpiece supporting means, and means slidably interconnecting said elongated sleeve and said feeding member operable to maintain said feeding member precisely in a constant angular relationship to said elongated sleeve.

10. In a dicing machine with a reciprocating blade package supporting frame, at least one multiple blade package comprising a multiplicity of relatively longer and narrower elongated very thin blades, a multiplicity of relatively shorter, wider and much thicker elongated spacers, a pair of replaceable shim means of the same predetermined thickness, and an elongated flat backing plate arranged to be precisely aligned with and fixedly secured to the blade package supporting frame, said backing plate including fixed relatively shorter elongated side rails dependent from opposite sides thereof and a movable relatively shorter elongated clamping means extending lengthwise of said backing plate and coacting with one of said side rails to secure said multiplicity of elongated very thin blades and said multiplicity of elongated spacers between said side rails so that the opposite ends of said elongated blades extend beyond the opposite ends of said elongated spacers and said elongated side rails and with the lower edges of the respective elongated blades dependent below the lower edges of the respective elongated spacers so that the lower edges of said elongated blades lie in a common plane, the spacing of the lower edges of said elongated blades relative to the lower edges of said elongated spacers being determined by said pair of replaceable shim means respectively interposed between said backing plate and the opposite ends of said elongated blades beyond the opposite ends of said elongated spacers and said elongated side rails.

11. Apparatus as described in claim 4, and, in addition, means for effecting precise alignment of each said blade package with the given direction of reciprocation comprising, at least one pair of spaced first and second positioning means projecting from said blade package supporting frame, means adjacent one end of each blade package for precisely positioning said one end of said blade package by pivotal engagement with said first positioning means, and adjustable means adjacent the other end of each blade package for precisely positioning said other end of said blade package by adjustable engagement with said second positioning means, said adjustable means including a cam element movably mounted in said blade package provided with a cam surface engaging said second positioning means and cam element adjusting means mounted in said blade package and operatively connected to said cam element to produce relatively small and precise pivotal displacement of said blade package about said first positioning means in response to relatively larger displacement of said cam element relative to said blade package.

References Cited

UNITED STATES PATENTS

| | | | |
|---|---|---|---|
| Re. 2,670 | 7/1867 | Law | 83—566 X |
| 1,144,139 | 6/1915 | Kinast | 83—700 X |
| 1,739,214 | 12/1929 | Darling | 30—304 |
| 2,186,429 | 1/1940 | Reinwald | 30—304 |
| 3,222,963 | 12/1965 | Nabullin | 83—11 X |
| 3,263,540 | 8/1966 | Lefevre et al. | 83—171 |

WILLIAM W. DYER, Jr., *Primary Examiner.*

JAMES M. MEISTER, *Examiner.*